United States Patent [19]

Kappeler et al.

[11] Patent Number: 5,014,302
[45] Date of Patent: May 7, 1991

[54] TELEPHONE

[75] Inventors: Markus Kappeler, Solothurn; Beat Voser, Grenchen, both of Switzerland

[73] Assignees: ETA SA Fabriques d'Ebauches, Switzerland; ETA SA Fabriques d'Ebauches, Switzerland

[21] Appl. No.: 536,100

[22] Filed: Jun. 12, 1990

[30] Foreign Application Priority Data

Jun. 22, 1989 [FR] France .................................. 89 08437

[51] Int. Cl.$^5$ ............................................. H04M 1/72
[52] U.S. Cl. ..................................... 379/165; 379/423
[58] Field of Search ................. 379/165, 422, 423, 166

[56] References Cited

U.S. PATENT DOCUMENTS

| 4,107,477 | 8/1978 | Morrison. | |
|---|---|---|---|
| 4,536,621 | 8/1985 | Bergen et al. | 379/165 |
| 4,817,138 | 3/1989 | Thomke et al. | |

FOREIGN PATENT DOCUMENTS 0287511 10/1988 European Pat. Off. .

OTHER PUBLICATIONS

French Search Report in Corresponding French Application.

Primary Examiner—Stafford D. Schreyer
Attorney, Agent, or Firm—Pollock, Vande Sande & Priddy; Pollock, Vande Sande & Priddy

[57] ABSTRACT

The invention relates to telephones that have a base and two handsets or one handset and a base acting as a second handset and which are adapted to be connected to two or more telephone lines. Unlike known telephones designed to be connected to a set number of lines and to no other, the telephone according to the invention comprises an adapter that enables it to be connected equally well to a single line as to two lines or more, depending on the maximum number of lines for which it has been designed, and to provide in each case the same scope for communication between parties as a known telephone connected to the same number of lines. The adapter preferably includes change-over switches that can be operated by acting on a control device that is accessible from outside the telephone, but it may also include change-over switches or wire connections located inside the telephone.

15 Claims, 4 Drawing Sheets

TELEPHONE

BACKGROUND

This invention relates to telephones.

It is known for telephones to have a base fitted with a keyboard or a disk for dialling call numbers and with a number of control knobs, and to have two handsets which may be placed on the base.

There are now also telephones having a single handset and whose base is so designed that it can be used as a second handset.

More generally, these telephones are either intended to be connected to the end of a single telephone line or intended to be connected to two lines or more.

The problem now is that each telephone is specifically designed to be connected to a set number of lines and to no other.

Thus, for instance, he who has a private telephone for two lines and moves into accommodation with only one available line, ends up with a useless telephone and must get another, which is of course a nuisance.

SUMMARY

The object of the invention is to provide a telephone which does not suffer from this drawback of existing telephones and to this end the telephone according to the invention comprises not only at least first and second pairs of terminals for connection to first and second telephone lines respectively, first and second sets each including an earpiece and a microphone, at least one ringing device, number selection means for dialling call numbers, first and second control means associated with said first and second sets respectively and able to be actuated at will to cause each of said sets to become operational or not, line selection means,. and first change-over switching means on which said first and second control means and said line selection means can act to selectively connect said number selection means and said first and second sets to said first and second pairs of terminals, but also adapter means which, when in a first state, enable the number selection means and said first and second sets to be connected by said first change-over switching means to the second pair of terminals and which prevent them from doing so when in a second state.

Thus, to link such a telephone to for example a single line when it had previously been linked to two, it suffices to cause its adapter means to pass from their first state in which they were to their second state and to replace the link cord for two lines that connected it to a socket by a cord for a single line or else to scrap the cord for the second line if two had been provided.

Further, if the adapter means have second change-over switching means able to be put in first and second states in line with their own and third control means to which access can be had from outside the telephone and which can be manually actuated to put said second change-over switching means in their first or second state and if, moreover, the terminals are made up for instance by the contacts of one or two jacks located at the rear of the telephone's base and into which may be introduced the plug or plugs of one or two cords, it is an easy matter to carry out oneself this change of connection.

But if the adapter means include for example a change-over switch or wire connections inside the telephone's base, which is perfectly possible, and if the wires of the link cord(s) have end portions that are fixed also inside the telephone's base for connection to the pairs of terminals, as often happens, the change of connection will be a little more difficult, but will not amount to a problem, at least for an electrician.

Moreover, it will be quite clear that as a result of the invention it is possible to manufacture a telephone that can be adapted and connected to any number of lines, whether less than or equal to an initially chosen number. For this, it suffices that its adapter means be arranged so that it can be put in a number of different states, corresponding to said maximumn number of lines and so to design its line selection means that, whatever number of lines it will subsequently be connected to, it can operate like an existing telephone and enable in particular two people to converse simultaneously with one outside person on a single line or with different outside people on two separate lines or a single person to be conversing at the same time with several others.

That said, it is clear also that the presently existing telephones that can be connected to more than two lines are relatively rare and that it is hardly conceivable to compel someone to buy or to hire a telephone that will provide him with possibilities that he will never be able to use and which will cost him more than the one he needs.

That is why it is necessary to envisage the case that will certainly be the most frequent, i.e., that in which the telephone according to the invention is designed to be linked to only one or two lines.

When things are so and as will be seen below, this telephone can be designed most simply and with a limited number of control members so that it may be used very easily.

DRAWINGS

Other features and advantages of the telephone according to the invention will become apparent on reading the following description of two possible forms of embodiment selected by way of example, which description refers to the accompanying drawings in which.

DESCRIPTION

Figure 1:
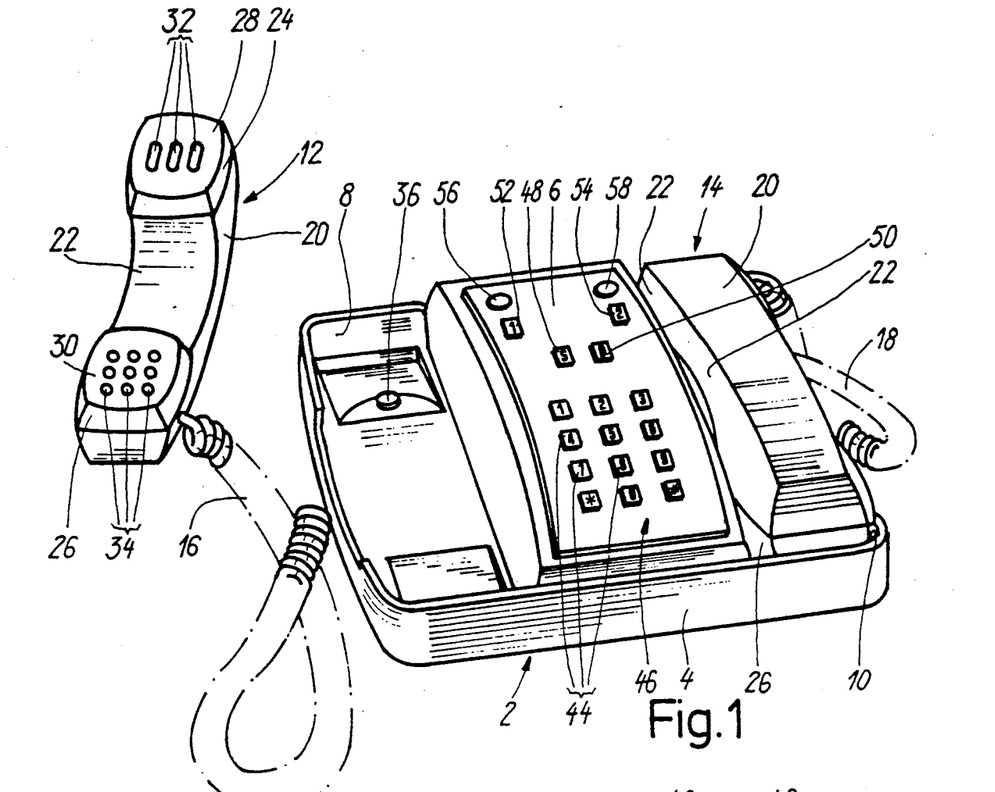
FIG. 1 is a perspective view which in particular shows the front of the telephone according to the invention when made according to the first embodiment.
Figure 2:
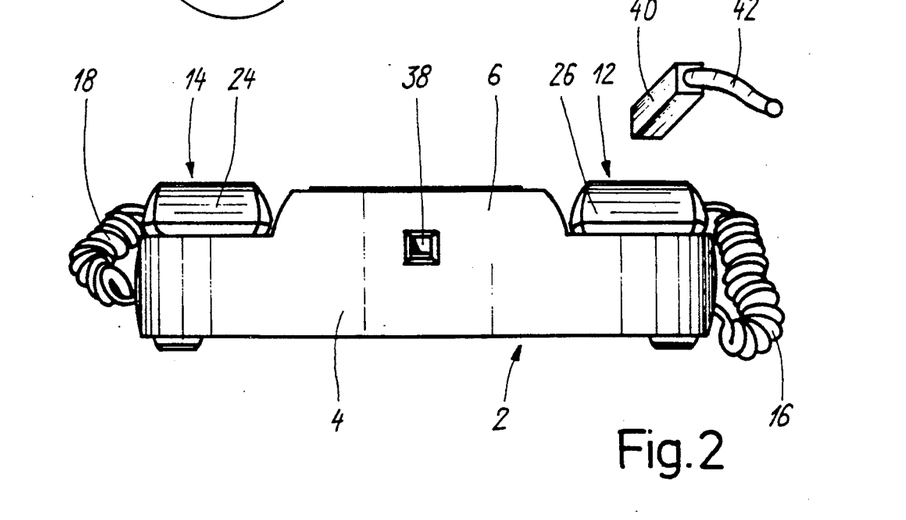
FIG. 2 is a view showing the rear of this same telephone.
Figure 4:
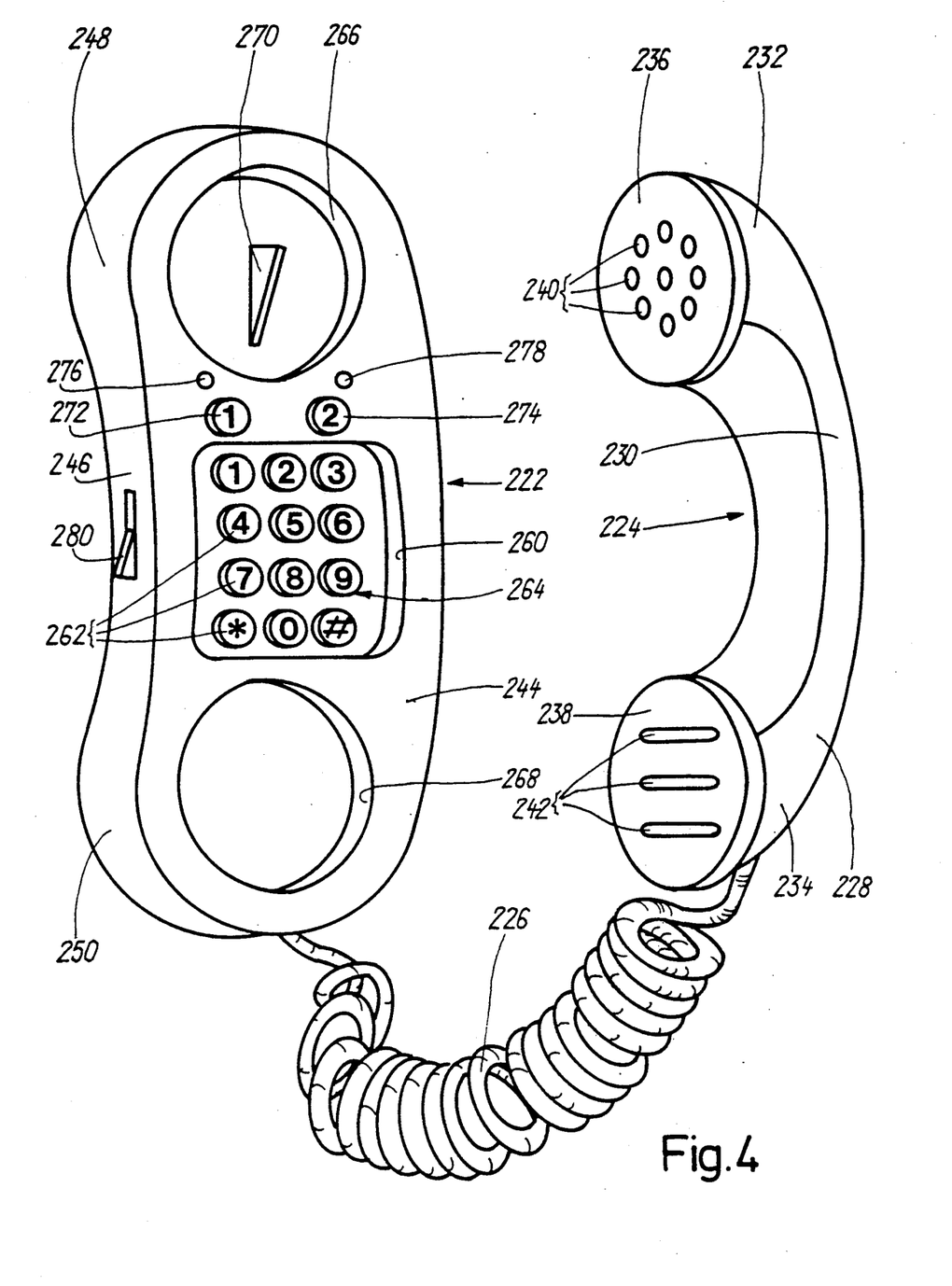
FIGS. 4 and 5 are perspective views showing under different angles the telephone according to the invention when made according to the other embodiment.
Figure 5:
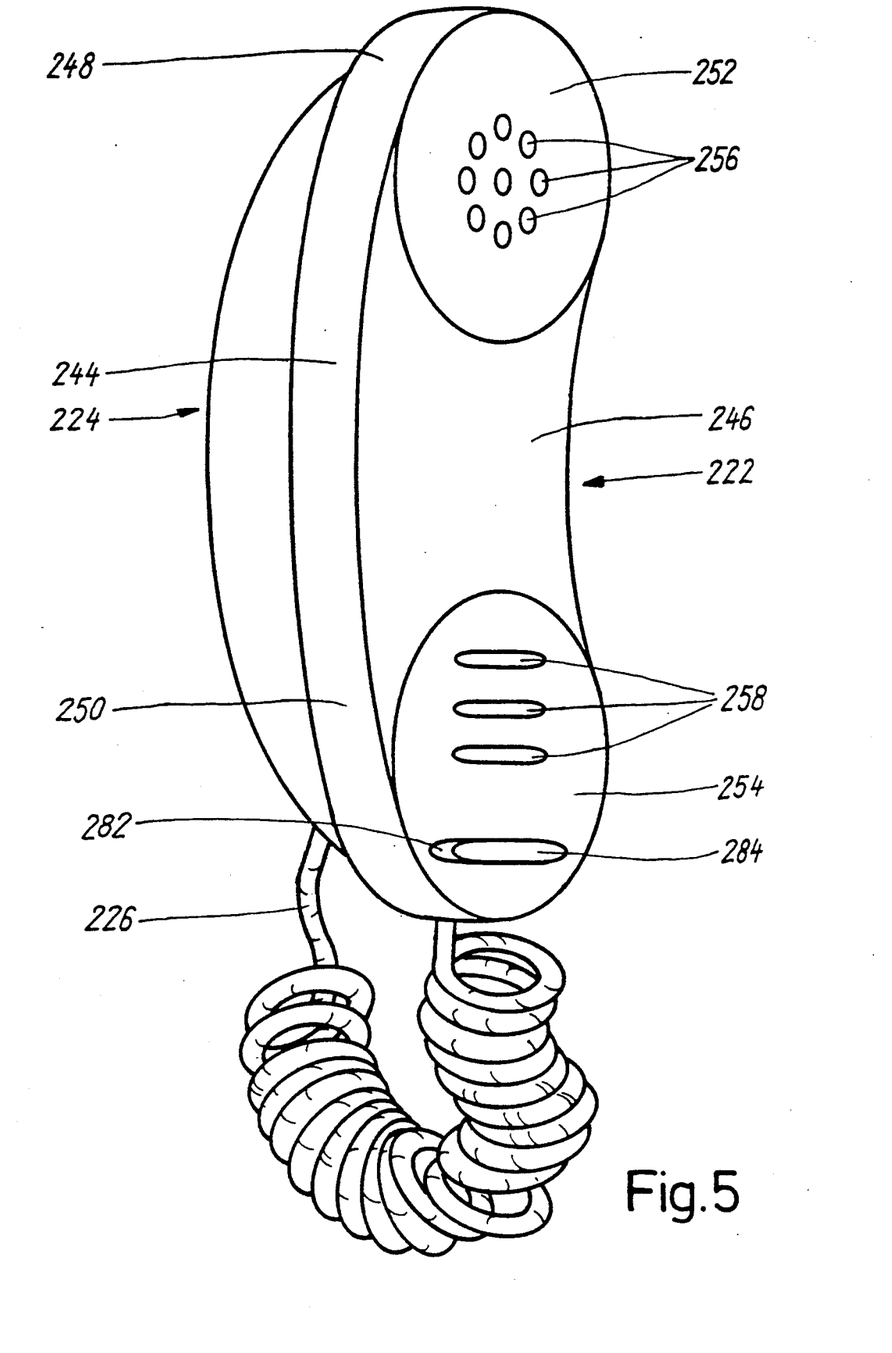

The illustrated telephones, seen from outside in FIGS. 1 and 2 and in FIGS. 4 and 5, are actually both telephones designed to be connected to only one or two lines.

That of FIGS. 1 and 2 comprises a base 2 having a casing 4 of essentially rectangular shape provided with a central prominent portion 6 and, on opposite sides thereof, two recesses 8 and 10 shaped to receive and hold in place a pair of identical handsets 12 and 14 that are connected to base 2 by cords 16 and 18 respectively.

As shown in FIG. 1, handsets 12 and 14 are quite conventional. They comprise each an elongated, slightly curved casing 20, having a central portion 22 that can readily be hand held and two end portions 24 and 26 with substantially flat surfaces 28 and 30 that are respectively formed with slots 32 and holes 34 and behind which are located an earpiece and a microphone or mouthpiece.

FIG. 1 also shows that at the bottom of recess 8 in base 2 there is a control push-button 36 extending through a hole in casing 4 and which is located at the spot where the face 28 of the end portion 24 of handset 12 bears when placed normnally on base 2. Thus, as long as handset 12, hereinafter termed "first", effectively is in that position, control button 36 is pressed in into casing 4 by handset 12. But when the latter is lifted, button 36 automatically pops out.

In fact, push-button 36, which constitutes the first control means mentioned earlier, plays the same part in relation to handset 12 as the hook that is still to be found in some conventional telephones having in particular one handset.

Of course, were the second handset 14 not shown lying on base 2 in FIG. 1, a second control push-button, identical to the first, would be visible at the bottom of recess 10. This second push-button is automatically actuated in the same way by placing handset 12 on base 2 and by lifting it and constitutes the second control means of the telephone.

Looking now at FIG. 21 it will be observed that casing 4 is provided at the back with a hole 38. At the bottom or on the sides of hole 38 are six contact members that are not visible in the drawing and which make of hole 38 a jack into which can be inserted a plug 40 having six corresponding contacts not shown and fitted at one end of a six-wire lead 42, to connect the telephone to two lines, or a plug having only four contacts and fitted at the end of a four-wire lead to connect the telephone to a single line.

Of course, only two pairs of contacts in jack 38 and two pairs or one pair of contacts of the plugs are in fact used to calls and telehone conversations but as is usual the jack and each plug are provided here with two additional contacts for other uses. They could for instance be useful in providing a ground conductor or an additional bell outside the telephone.

Moreover, if reference is again made to FIG. 1, the twelve keys 44 of a conventional selection or dialling keyboard 46, two push-buttons 48 and 50 located above keyboard 46 and respectively bearing letters S and D, and two other push-buttons 52 and 54 located above the previous ones and respectively bearing numbers 1 and 2, can be seen to project from the front face of the central portion 6 of casing 2.

In the embodiment now being described push-buttons 48 and 50 are not independent. They are mechanically linked such that, upon one being pressed in, the other is necessarily raised and the same applies to push-buttons 52 and 54. The pairs of push-buttons 48, 50 and 52, 54 are thus each equivalent to a rotary or rocking button having two stable positions or to a sliding button like those to be found in many switches which serve to switch on or off an electric lamp or are used to operate household devices.

Further, suffice it to say in addition for the time being that push-buttons 48 and 50 here constitute the third control means discussed earlier and which enable the telephone to be adapted when it is connected to one line only instead of two or conversely and that push-bottons 52 and 54 constitute here the line selection means also discussed earlier. It will be explained further on how these various push-buttons can be acted on to use the telephone in whatever way required. Finally, to finish with its outer appearance and before describing its electric circuitry shown in FIG. 3, it should still be pointed out that this telephone further has two light-emitting diodes (LED) 56 and 58 associated with push-buttons 52 and 54 and placed above the latter and which are only really useful when the telephone is connected to two lines as they are meant to indicate on lighting up which line a call is coming in on.

Naturally, it would also be possible for these diodes to be made to indicate also the line that one has selected to make an outgoing call but, as will become apparent later, if the telepone is used normally, this can simply be ascertained by looking to see which of push-buttons 52 and 54 is in or out.

Figure 3:
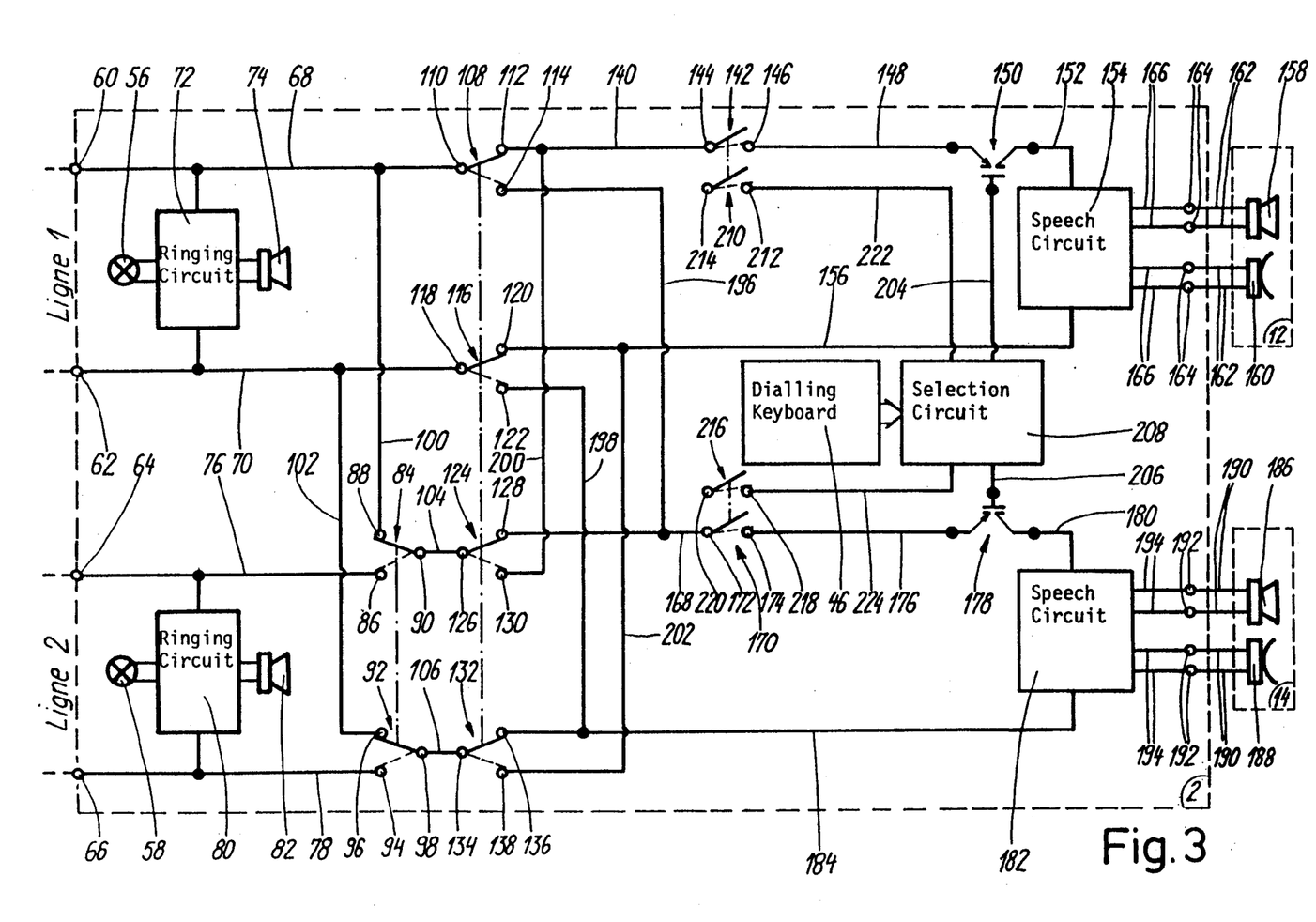
FIG. 3 is a simplified block diagram of the electric circuitry of this telephone.

In FIG. 3 can be seen two first, circuit terminals 60 and 62 which represent the first pair of contacts of the telephone's jack 38 and which enable the telephone to be connected in the manner indicated to a single line or to a first line which will be termed "line 1" in both cases and two other terminals which represent the second pair of contacts of jack 38 and which enable the telephone to be connected also to a secon dline which will be termed "line 2".

From terminals 60 and 62 extend two conductors 68 and 70 which, like those that will be discussed later, may consist of conductive strips of a printed circuit, and between which is connected a first ringing circuit 72 that not only controls a buzzer 74 but also light-emitting diode 56 (see FIG. 1).

Similarly, from terminals 64 and 66 extend two more conductors 76 and 78 between which is connected a second ringing circuit 80 that controls a second buzzer 82 and diode 58.

Since diodes 56 and 58 already indicate on which line a call is being transmitted, it is not necessary for the two buzzers to emit sounds having different frequencies but this possibility is obviously not to be excluded.

That said, it will be observed that conductors 76 and 78 are connected to two non common terminals 86 and 94 of two bistable change-over switches 84 and 92 and that the other non common terminals 88 and 96 of switches 84 and 92 are respectively connected by conductors 100 and 102 to conductors 68 and 70.

It will further be observed that, by virtue of the chain dotted line connecting them in FIG. 3, the contacts of switches 84 and 92 are actuated simultaneously. On the other hand, what FIG. 3 does not show is that they are so actuated by push-buttons 48 and 50 (see FIG. 1). Switches 84 and 92 thus are in the present case the second change-over switching means which form, along with push-buttons 48 and 50 and conductors 100 and 102, the telephone's adapter means.

The first change-over switching means include four other bistable change-over switches 108, 116, 124 and 132 whose contacts are all acutated at the same time when either of push-buttons 52 and 54 is being acted upon (see FIG. 1).

The first two, 108 and 116, of these change-over switches have common terminals 110 and 118 to which conductors 68 and 70 are directly connected and the other two, 124 and 132, have comon terminals 126 and 134 which are connected by conductors 104 and 106, respectively, to the common terminals 90 and 98 of switches 84 and 92.

Looking now at the upper part of FIG. 3, it will be observed that one of the non common terminals 112 of switch 108 is connected by a conductor 140 to one of the terminals 144 of a simple on-off switch 142 whose contact is actuated by the first control push-button control 36 associated with the first handset 12 (see FIG. 1). The other terminal 146 of switch 142 is connected by a conductor 148 to the emitter of a bipolar transistor 150 whose usefulness will become apparent later and whose collector is connected by a conductor 152 to a first speech circuit 154 which is connected moreover directly, by a conductor 156, to one of the non common terminals 120 of switch 116

Speech circuit 154, to which earpiece 158 and microphone 160 of the first handset 12 are connected by the four wires 162 of lead 16, four terminals 164 located inside the casing 4 of base 2 and four conductors 166, is a wholly conventional circuit and, as is known, in an ordinary telephone, the speech circuit is that which transmits, after having processed them, speech signals from the line or one line to the earpiece of the or one handset and speech signals that are produced by the microphone from the latter to the line in questions.

Looking now at the lower part of FIG. 3, one finds again a circuit portion absolutely identical to that which has just been described.

In particular, a conductor 168 connects one of the non common terminals 128 of switch 124 to one of the terminals 172 of another simple on-off switch 170 which is actuated by the second control push-button associated with the second handset 14 and which, like on-off switch 142, also forms part of the first change-over switching means of the telephone. From the other terminal 174 of on-off switch 170, a conductor 176 extends to the emitter of another bipolar transistor 178 whose collector is connected by a conductor 180 to a second speech circuit 182 identical to the first speech circuit 154. A further conductor 184 provides a direct link between one of the non common terminals, 136, of switch 132 and the second speech circuit 182 to which are connected earpiece 186 and microphone 188 of second handset 14 by the four wires 190 of lead 18, four more internal terminals 192 and four conductors 194.

As to the other non common terminals 114, 122, 130 and 138 of switches 108, 116, 124 and 132, they are respectively connected to conductors 168, 184, 140 and 156 by four conductors 196, 198, 200 and 202.

Reverting to transistors 150 and 178, it should be noted that they form part of the telephone's number selection means and their function is to produce and transmit on the single line or on the lines, depending on the way the telephone is linked up, call signals, more accurately pulses, when subscriber's numbers are being dialled on keyboard 46. But when a connection has been made, each transistor is simply required to transmit the speech signals on the line or a line to the speech circuit to which it is connected and the speech signals generated by the speech circuit to said line.

To this end, the bases of transistors 150 and 178 are both connected, by conductors 204 and 206 respectively, to a selection circuit 208 which is connected to keyboard 46, diagrammatically represented in FIG. 3 by a square, and which controls them in such a manner as to be alternately conductive and non-conductive when they are required to generate call pulses and to remain conductive when they are required to generate speech signals.

Further, it is obvious that, when the telephone is linked up to two lines and when someone dials a number on the keyboard after picking up a handset with a view to being connected to one line when the other is already in use, no pulses must also be transmitted at that time on that other line. To do this, selection circuit 208 must know at all times whether on-off switches 142 and 170 are open or closed. That is why switches 142 and 170 have associated therewith two other simple on-off switches 210 and 216 that are actuated at the same time as switches 142 and 170 and which each have a terminal 212, respectively 218, connected by a conductor 222, respectively 224, to circuit 208, the other terminals 214 and 220 of switches 210 and 216 being connected to one of the terminals of a d.c. voltage supply source not shown of the telephone.

Selection circuit 208 will not be described in detail because it forms no part of the invention and it can be constructed like the selection circuits of some known telephones designed to be linked up to two lines and to issue thereto only pulse call signals.

Further, circuit 208 and transistors 150 and 178 could quite clearly be replaced by a circuit that would be connected to speech circuits 154 and 182 and which would generate call signals by combining into pairs signals of different acoustic frequencies. Another possibility would be to retain the transistors and to have a selection circuit that is also connected to the speech circuits and which would generate this kind of signal and control the transistors such as to issue pulses whereby the telephone may be linked to any kind of network.

Finally, the various supply circuits and protection circuits, in particular against overvoltages and polarity reversals of the input voltages from the lines, that exist in a telephone according to the invention as in all others, should clearly also be discussed for the sake of completeness, but since these circuits are very well known and form no part of the invention either, there is no need to do so.

The operation of the telephone illustrated in FIGS. 1 to 3 will now be explained.

Suppose first that the telephone has just been linked up to a single line, i.e. line 1.

The first thing that normally needs to be done is to press button 52 and button 48 if they are not already depressed.

When button 52 is depressed the contacts of change-over switches 108, 116, 124 and 132 are in the positions indicated in full lines in FIG. 3, with the result that their common terminals 110, 118, 126 and 134 are connected to their non common terminals 112, 120, 128 and 132, and when button 48 is also depressed the contacts of change-over switches 84 and 92 are also in the positions indicated in full lines in FIG. 3, thereby to connect the common terminals 90 and 98 of switches 84 and 92 to their non common terminals 88 and 96.

As for on-off switches 142, 210, 170 and 216, they remain open as long as both handsets rest on base 2 and as long as the first, 36, and second control push-buttons are also depressed.

Suppose now that a call is to be made.

To do this, one of the handsets, for example the first 12 is lifted to begin with. This causes push-button 36 to pop out and on-off switches 142 and 210 to close without modifying the state of the other two on-off switches nor the position of the contacts of the six bistable change-over switches.

From then on, the first speech circuit 54 is connected to terminals 60 and 62, i.e. to line 1, by a first internal line which includes, firstly, conductor 152, transistor 150 which is then conductive, conductor 148, the contact of on-off switch 142, conductor 140, the contact of change-over switch 108 and conductor 68, and, secondly, conductor 156, the contact of change-over switch 116 and conductor 70.

Thus, to call a particular subscriber, it suffices to dial his call number on keyboard 46 after hearing the dialling tone, to cause transistor 150 to transmit a pulse train corresponding to this number. The subscriber can then be conversed with if he answers and when at the end of the first handset is put down again, on-off switch 142 opens again, along with on-off switch 210, and interrupts the internal line.

If, instead, the second handset 14 is used ot call this subscriber, it is the second control push-button that pops up, on-off switches 170 and 216 that close and the second speech circuit that is automatically connected to line 1 by a second internal line formed, firstly, by conductor 180, transistor 178, conductor 176, the contact of on-off switch 170, conductor 168, the contact of change-over switch 124, conductor 104, the contact of change-over switch 84, conductor 200 and a portion of conductor 68, and, secondly, by conductor 184, the contact of change-over switch 132, conductor 106, the contact of change-over switch 92, conductor 102 and a portion of conductor 70. Further, here it is of course the second transistor 178 which is controlled by selection circuit 208 to generate the pulses of the number being dialled.

In either case, if another person wants to take part in the conversation between the caller and the subscriber, all he or she need do is to pick up the other handset whereby the speech circuit associated therewith may also be connected to line 1 by the unused line of the above-mentioned pair of inner lines.

This other person may be of course stop taking part in the conversation whenever he or she wants to by putting the handset he or she is holding back on base 2. This person may also carry on the conversation alone if the caller puts his or her own handset down.

Moreover, the caller may of course also use both handsets at the same time, for instance to hear better when in nosiy surroundings, and, when receiving a call signalled by the operation of buzzer 74 and the lighting up of diode 56, everything happens in the same way except that there is no need to dial a number.

Consider now what happens when no check is made at the start to make sure button 52 is depressed or when, later, button 54 is or is not deliberately depressed, on other words when the contacts of change-over switches 108, 116, 124 and 132 are in or are returned to the positions shown in broken in which these contacts lines in FIG. 3, i.e. the positions connect common terminals 110, 118, 126 and 134 to the non common terminals 114, 122, 130 and 138. What happens when the same is done with buttons 48 and 50 will be considered later.

On looking at FIG. 3 carefully, it will be found that the contacts of change-over switches 108, 116, 124 and 132 not being the same positions in no way affects the operation of the telephone except that, on picking up handsets 12 and 14, speech circuits 154 and 182 are no longer connected to line 1 by the same internal lines as before.

More particularly, with the first speech circuit 154 the connection then takes place via a third internal line which includes, firstly conductor 152, transistor 150, conductor 148, the contact of on-off switch 142, a portion of conductor 140, conductor 200, the contact of change-over switch 124, conductor 104, the contact of change-over switch 84, conductor 108 and a portion of conductor 68, and, secondly, a portion of conductor 156, conductor 202, the contact of change-over switch 132, conductor 106, the contact of change-over switch 92, conductor 102 and a portion of conductor 70, whereas with the second speech circuit the connection takes place via a fourth internal line formed, firstly, by conductor 180, transistor 198, conductor 176, the contact of on-off switch 170, a portion of conductor 168, conductor 196, the contact of change-over switch 108 and conductor 68, and secondly, a portion of conductor 184, conductor 198, the contact of change-over switch 116 and conductor 70.

But as regards push-button 48 and 50 and the contacts of change-over switches 84 and 92 that they actuate, it is visible that if these contacts are in the positions shown in broken lines wherein they connect common terminals 90 and 98 to the non common terminals 86 and 94, they prevent either the first speech circuit or the second speech circuit from being connected to line 1 by the third and second internal lines respectively, depending on whether the contacts of the four other change-over switches are in the positions shown in broken lines or in full lines. In fact, there is nothing unusual in this because it must not be forgotten that change-over switches 84 and 92 form part of the adapter means. In doing this, they are therefore only playing their part. What however must be noted is that when the telephone is linked to a single line and subject to the one condition that button 48 is always depressed use can be made of either handset to make an outgoing call or to answer an incoming call without having to do anything more than pick up the selected handset and possibly dial a number and that it is then possible to use the other handset only by picking it up. The manner of using the telephone is thus simplified to the utmost.

Suppose now that the telephone is connected to lines 1 and 2.

If an outgoing call is to be made and if no-one else is using the telephone either handset can be used and there is normally no reason for selecting one line rather than the other.

If push-button 48 is depressed when picking up a handset everything happens as if the telephone were only connected to line 1. As explained earlier, this also applies when both handsets are being used at the same time.

But if it is push-button 50 that is depressed everything then depends on the position of push-buttons 52 and 54.

If push-button 52 is also depressed, the first speech circuit 152 is automatically connected to line 1 by the first internal line if use is made of the first handset 12 for making a call. If use is made of the second handset 14, the second speech circuit 182 is automatically connected to line 2 by a fifth internal line which includes all of the parts of the second internal line up to and including the contacts of change-over switches 84 and 92, plus conductors 76 and 78.

But if push-button 52 is out and push-button 54 is in and if use is made of the first handset, the first speech circuit is connected to line 2 by a sixth internal line which includes all of the parts of the third internal line up to and including the contacts of change-over switches 84 and 92, plus conductors 76 and 78, and if use is made of the second handset the second speech circuit is connected to line 1 by the fourth internal line.

Suppose now, that push-button 52 is depressed and that the subscriber who has been called is on the line. If the someone else wants to call another subscriber on line 2 all this other person need do is to check that push-button 50 is depressed or to depress it, to pick up the second handset and to dial the number of the other subscriber. After that, each of the four talking may end the conversation he or she is having whenever he or she wants to by putting down the handset he or she is holding, without disturbing the conversation on the other line. Further, rather than call another subscriber, this other person could instead reply to an incoming call on line 2, signalled by buzzer 82 and diode 58. Also, as previously described, this other person could also take part in the conversation on the other line by pressing push-button 48 if it is not depressed.

It will already have become apparent from what has been said above the telephone can be used in many ways and it would be pointless and tedious to consider them all.

Suffice it therefore to say that, when it is connected to two lines and properly used, the telephone shown in FIGS. 1 to 3 provides with only its two pairs of coupled push-buttons 48, 50 and 52, 54, the same communication possibilities as the known telephones that are specifically designed for that, i.e. for connection to two lines.

To conclude, before describing the second embodiment that has been chosen by way of example and which is shown in FIGS. 4 and 5, it should be noted that the on-off switches and the bistable change-over switches in the circuitry of FIG. 3 could be produced with transistors rather than with movable contacts and terminals and that these on-off switches and change-over switches, the speech circuits 154 and 182, the transistors 150 and 178, the selection circuit 208 and even, possibly the ringing circuits 72 and 80 could all be included in a single integrated circuit chip.

The telephone illustrated in FIGS. 4 and 5 comprises a base 222 provided with a jack not shown to enable it to be connected to a single telephone line or to two telephone lines in the same way as the previous telephone and a single handset 224 that can be placed on base 222 and which can be connected thereto by a cord 226.

Here again, there is nothing special about handset 224. It also comprises an elongated and arcuate casing 228 with a central portion 230 and two end portions 232 and 234 having substantially flat surfaces 236 and 238 repsectively provided with holes 240 and slots 242 behind which are located an earpiece and a microphone.

In this second embodiment, base 222 is designed to itself act as a second handset and to this end it comprises a casing 244 having a general shape similar to that of the casing of handset 224 and housing another earpiece and another microphone.

More particluarly, casing 244, which is slightly larger than that of handset 224 and likewise elongated and curved, also comprises a central portion 246 intended to be hand held and two end portions 248 and 250 of more or less the same size and which are provided on the underside of the base with flat surfaces 252 and 254 formed with holes 256 and slots 258 (see FIG. 5) and behind which are located the above-mentioned earpiece and the microphone located substantially in a common plane.

Surfaces 252 and 254 are of course flat and coplanar to enable base 222 to be stable when it rests on some horizontal support, e.g. a telephone table. It will however be clear that the flatness of these surfaces is not an essential condition to ensure such stability. The same result could for instance be achieved with slightly hollow surfaces having their edges in a common plane or with slightly bulging surfaces having only flat and coplanar central portions or with a combination of these two possibilities.

That said, on viewing FIG. 4 it will be seen that the top or front of casing 244 is formed with a recess 260 in its central portion 246 through the bottom of which protrude the twelve keys 262 of a selection or dialing keyboard 264 and in its end portions 248 and 250 with two more, smaller recesses 266 and 268 having a shape which enables them to receive the end portions 232 and 234 of the handset when the latter is provided a slot through which can issue a first control push-button 270 which corresponds to control push-button 36 in the FIG. 1 telephone, and which may be actuated in the same way as handset 224.

It will also be noted that there are, above recess 260, two buttons 272 and 274, with numbers 1 and 2 on them and above which are positioned two light-emissive diodes 276 and 278, and that there is on one side of casing 244 another button 280. Buttons 272 and 274 are push-buttons that correspond to push-buttons 52 and 54 in the FIG. 1 telephone and which are also mechanically linked in such manner that when one is pushed in the other pops out. Button 280, however, is a rocking button having two stable positions, which bears letters S and D and which here replaces buttons 48 and 50 of the previously described telephone. Further, button 280 is located in the central portion of base 222 on the side and more or less where the thumb of a right-handed person comes to be placed when he or she picks up base 222 whereby it may readily be actuated by a large number of people.

Finally, with reference to FIG. 5, it will be seen that the surface 254 of the central portion 250 of the base's casing 244 is formed, in addition to the slots 258 discussed earlier and which are provided to allow the sound of the voice to pass through, with another slot 282 in which may travel another push-button 284 of a kind similar to button 270, which remains depressed as long as base 222 rests on a support and which automatically pops out of the base's casing 244 when it is lifted. Button 284 corresponds of course to the FIG. 1 telephone's second push-button which is actuated by the second handset 14 whose part is here played by base 222.

The FIG. 3 circuitry would also be quite suitable for the second telephone just described provided of course earpiece 186 and microphone 188 are included in base 222 and are connected to the second speech circuit 182 by internal connections only.

Further, the way this second telephone should be used readily follows from the way in which the first is used, bearing in mind that it is usual first to use handset 224 to make a call or to answer a call. It will therefore not be necessary to explain it.

The invention is obviously not restricted to the embodiments that have just been described.

For instance, in some telephones the selection keyboard may be placed by a call disc.

An embodiment could also very well be imagined in which one or the handset is connected to the corresponding speech circuit not by a cord and internal conductors any more, but by radio. In this case, the telephone would further need to be provided with a first transmitter, a first receiver and a battery lodged in the casing of said handset, a first antenna connected to the first receiver and which could be included also in the casing or be an outer, e.g. telescopic, antenna, a second receiver, a second transmitter connected to said speech circuit and a second antenna, the second transmitter and second antenna being associated with the base, and finally a supply system including an AD/DC converter for recharging the battery of the handset when the latter is not being used.

What is claimed is:

1. A telephone comprising:
   at least first and second pairs of terminals for connection to first and second telephone lines respectively;
   first and second sets each including an earpiece and a microphone;
   ringing means;
   number selection means for dialing call numbers;
   first and second control means respectively associated with said first and second sets and able to be actuated at will to cause each of said sets to be operational or not;
   line selection means;
   first change-over switching means on which said first and second control means and said line selection means can act to selectively connect said number selection means and said first and second sets to said first and second pairs of terminals; and
   adapter means which, when in a first state, enable said number selection means and said first and second sets to be connected by said first change-over switching means to said second pair of terminals and which prevent them from doing so when in a second state.

2. A telephone according to claim 1, wherein said adapter means include second change-over switching means able to be put in first and second states corresponding to their own and third control means to which access may be had from the outside of the telephone and which may be actuated manually to put said change-over switching means in their first or second state.

3. A telephone according to claim 2, wherein said first and second change-over switching means and said line selection means are arranged to enable said first and second sets to be connected separately or jointly to said first pair of terminals or to actuate respectively only one or other of said first and second control means or both, when said second change-over switching means are in their second state.

4. A telephone according to claim 3 for connection to two or more lines, wherein said first and second change-over switching means are arranged to cooperate in a manner such that each said set will be connected to said first pair of terminals when the control means associated therewith is actuated to put it in an operative condition, without said line selection means having to act on said first change-over switching means, when said change-over switching means are in their second state, said number selection means being then connected to said first pair of terminals jointly with the set that is put in an operative condition, when it is the only one or with that one of the sets which is first put in that condition when they both are.

5. A telephone according to claim 4, wherein said first change-over switching means are further arranged to cooperate in a manner such that, when said second change-over means are in their first state and when one of said sets already is in an operative condition and is connected, with said pairs of terminals selected by said line selection means the other set and said number selection means will be connected to the other pair of terminals when the control means that are associated with this other set are actuated to put them in an operative condition, without said line selection means needing to act on said first change-over switching means.

6. A telephone according to claim 3 for connection to two or more telephone lines, wherein said first and second change-over switching means are arranged to cooperate in a manner such that said first set and said number selection means will be connected to said first pair of terminals when the first control means is actuated to put said first set in an operative condition, without said line selection means having to act on the first change-over switching means, when said second change-over switching means are in their second state.

7. A telephone according to claim 6, wherein said first and second change-over switching means are also arranged to cause said second set also to be connected to said first pair of terminals without said line selection means having to act on the first change-over switching means, when the second change-over switching means are in their second state and when said first set and said number selection means are already connected to said first pair of terminals.

8. A telephone according to claim 6, wherein said first and second change-over switching means, additionally cooperate in a manner such that, when said second change-over switching means are in their first state and when said first set already is in an operative condition and connected, with said number selection means to one of said pairs of terminals selected by said line selection means, the second set and said line selection means will be connected to the other pair of terminals when the control means associated with said second set is actuated to put it in an operative condition, without said line selection means having to act on said first change-over switching means.

9. A telephone according to claim 1, wherein said line selection means include other control means to which access may be had from outside the telephone and which may be actuated manually.

10. A telephone according to claim 1, further comprising ringing means connected across the terminals of each of said pairs.

11. A telephone according to claim 1, further comprising a light source associated with each pair of terminals to indicate on which line an incoming call is being made when the telephone is linked to more than one line.

12. A telephone according to claim 1, having two handsets which comprise each a casing in which is housed one of said first and second sets and a base able to carry both said handsets and which conprises a casing said pairs of terminals said ringing means said number selection means said first and second control means, said line selection means said first change-over switching means and said adapter means said first and second control means having respective members capable of being automatically actuated upon placing the handsets on the base and upon removing them.

13. A telephone according to claim 1, having a handset comprising a casing in which is housed said first set, comprises a casing said pairs of terminals, said second set, said ringing means, said number selection means, said first and second control means, said line selection means said first change-over switching means and said adapter means wherein said first control means include a push-button capable of being automatically actuated upon placing the handset on the base and upon removing it, and wherein the shape of the base's casing and the arrangement of the earpiece and of the microphone of said second set within the base's casing are such that said base may be used as a second handset.

14. A telephone according to claim 13, wherein said second control means include another push-button located under the base and able to be automatically actuated upon placing said base on a support and upon lifting it.

15. A telephone according to claim 7, wherein said first and second change-over switching means additionally cooperate in a manner such that, when said second change-over switching means are in their first state and when said first set already is in an operative condition and connected, with said number selection means, to one of said pairs of terminals selected by said line selection means, the second set and said line selection means will be connected to the other pair of terminals when the control means associated with said second set is actuated to put it in an operative condition, without said line selection means having to act on said first change-over switching means.

* * * * *

UNITED STATES PATENT AND TRADEMARK OFFICE
CERTIFICATE OF CORRECTION

PATENT NO. : 5,014,302  Page 1 of 2
DATED : May 7, 1991
INVENTOR(S) : Markus Kappeler and Beat Voser It is certified that error appears in the above-identified patent and that said Letters Patent is hereby corrected as shown below:

Cover Page, column 1, line 5, change "Assignees:" to --Assignee:--, and lines 6-7, delete "; ETA SA Fabriques d'Ebauches, Switzerland"; and column 2, line 6, delete "; Pollock, Vande Sande & Priddy".

Column 11, line 62, after "one" insert --,--.

Column 12, line 2, after "with" insert --said number selection means, to one of--.

Column 12, line 3, after "means" insert --,--.

Column 12, line 29, after "means" delete ",".

Column 12, line 34, after "means" insert --,--.

Column 12, line 56, change "conprises" to --comprises--.

Column 12, line 57, after "ing" insert --,--; after "terminals" insert --,--; and after "means" insert --,--.

UNITED STATES PATENT AND TRADEMARK OFFICE
CERTIFICATE OF CORRECTION

PATENT NO. : 5,014,302

DATED : May 7, 1991

INVENTOR(S) : Markus Kappeler and Beat Voser

It is certified that error appears in the above-identified patent and that said Letters Patent is hereby corrected as shown below:

Column 12, line 58, before "said" insert --,--.

Column 12, line 59, after "means" insert --,--.

Column 12, line 60, after "adapter means" insert --,--.

Column 12, line 66, before "comprises" insert --and a base able to carry said handset and which--; and after "casing" insert --,--.

Column 13, lines 1 and 2, after each first occurrence of "means" insert --,--.

Signed and Sealed this

Fifteenth Day of September, 1992

Attest:

DOUGLAS B. COMER

*Attesting Officer*     *Acting Commissioner of Patents and Trademarks*